United States Patent Office 3,186,359
Patented June 1, 1965

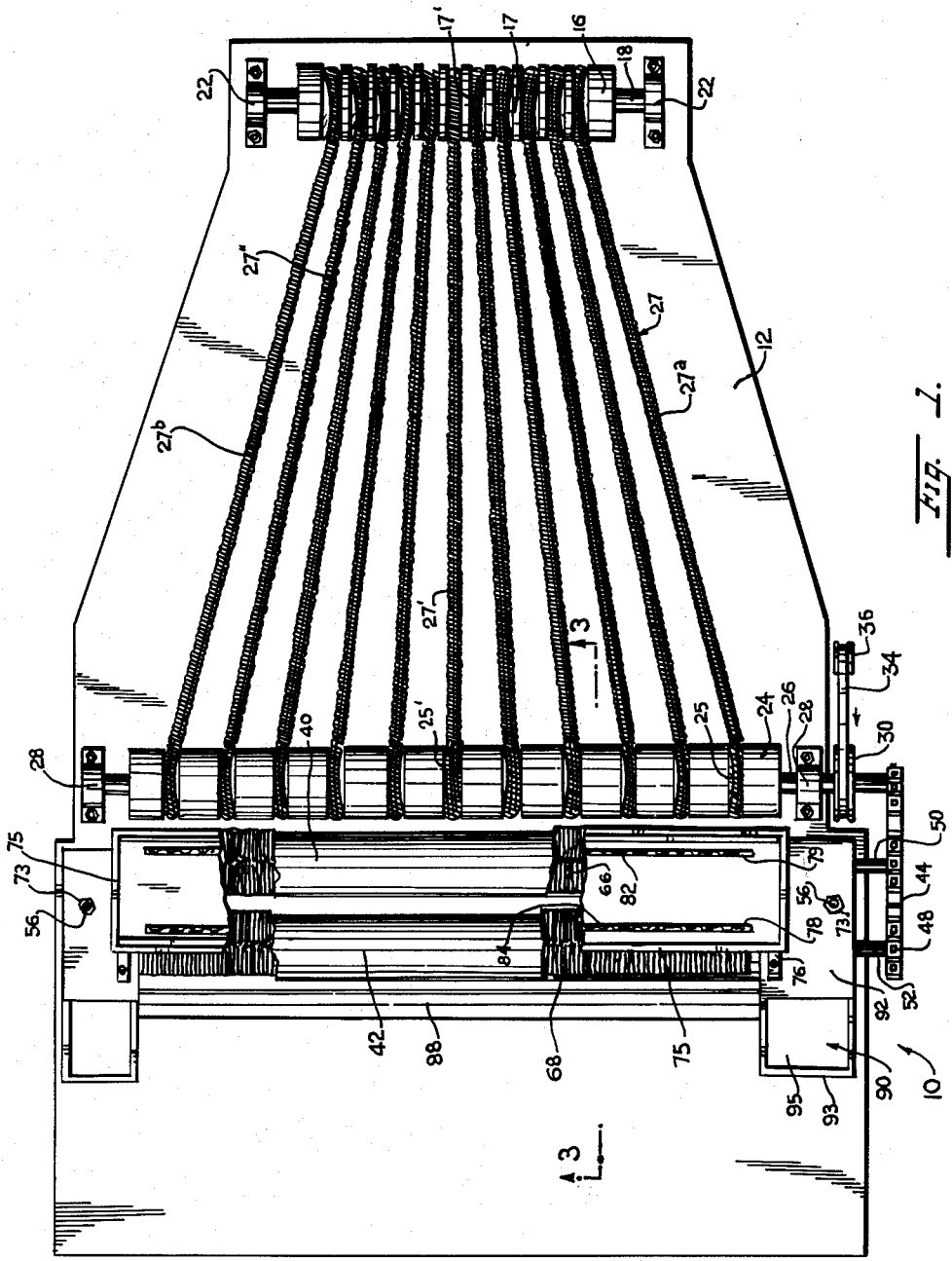

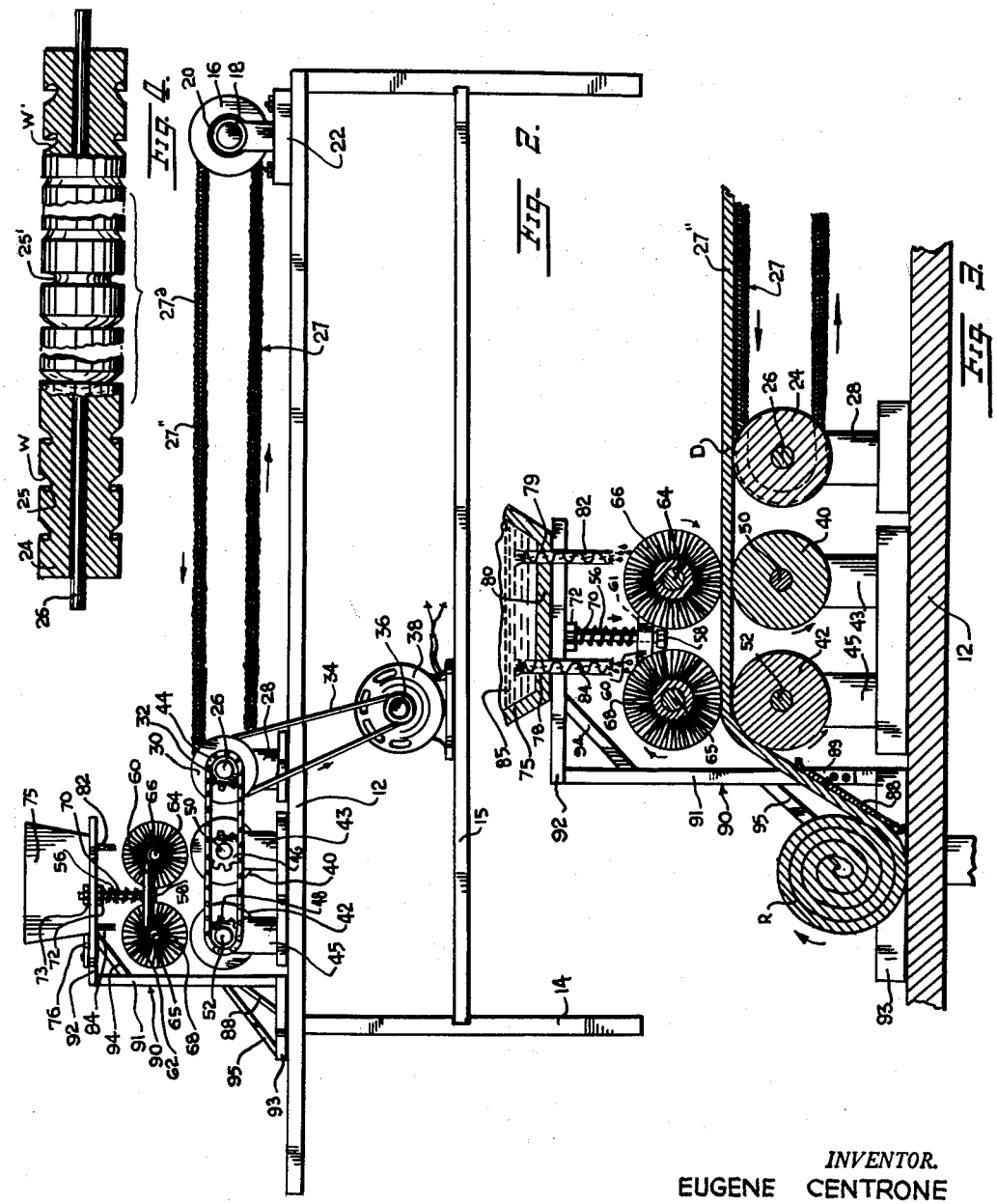

3,186,359
PASTRY DOUGH SPREADING AND
ROLLING MACHINE
Eugene Centrone, 108—22 42nd Ave., Corona, N.Y.
Filed Sept. 17, 1962, Ser. No. 223,900
1 Claim. (Cl. 107—9)

This invention concerns a machine for spreading and rolling dough in making pastry, cookies, cakes, noodles and the like.

Heretofore it has been customary to roll dough by hand or by machine to form a thick narrow sheet. Where a very thin sheet of dough is required, such as in making pastry, it has been necessary to roll the thick sheet of dough by hand with a rolling pin or to stretch the dough by hand to achieve the required thinness. This thinning procedure requires considerable skill to do satisfactorily and is very time consuming.

It is an object of the present invention to provide a machine in which a narrow, thick sheet of dough is stretched in width and thinned automatically and continuously as the thick sheet is fed to the machine.

A further object is to provide a machine as described wherein the stretched and thinned sheet is formed into a roll as it issues from the machine.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a top plan view of a machine embodying the invention.

FIG. 2 is a side elevational view of the machine.

FIG. 3 is a sectional view on an enlarged scale taken on line 3—3 of FIG. 1, showing the machine in use.

FIG. 4 is a side view partially in section of a roller employed in the machine, parts of the roller being broken away.

Referring to the drawings, there is shown machine 10 including a table with a flat horizontal platform 12 supported on vertical legs 14. A horizontal shelf 15 is supported below the platform 12. On the platform at its narrow right end as shown in the drawing is a first cylindrical roller 16 having a shaft 18 rotatably journaled in bearings 20 carried in bearing brackets 22 secured to the top of the platform. Another cylindrical roller 24 is horizontally spaced from roller 16 at the wider left end of the platform. Roller 24 has an axial shaft 26 journaled in bearing brackets 28 on the platform. At one end the shaft carries a pulley 30 and a sprocket 32. Entrained on pulley 30 is a belt 34 passing over a drive pulley 36 carried by the shaft of electric motor 38. The motor is supported on shelf 15 and serves to rotate the roller 24 continuously.

Two further rollers 40, 42 are rotatably journaled in bearing brackets 43, 45 and are horizontally spaced from roller 24 on platform 12. Sprockets 46, 48 are carried on the ends of shafts 50, 52 of rollers 40, 42. An endless chain 44 is entrained over sprockets 32, 46 and 48 so that all the rollers 24, 40 and 42 rotate together.

The rollers 16, 24, 40 and 42 all have the same diameter and are disposed axially parallel to each other on the same horizontal plane. Roller 16 has a series of axially spaced circumferential grooves 17. Roller 24 has a series of axially spaced circumferential grooves 25. Grooves 25 are spaced apart axially greater distances than the axial spacing of grooves 17, so that roller 24 may be several times longer than roller 16. Entrained on the rollers 16 and 24 are endless belts in the form of coil springs 27. The springs are arranged in a divergent or fanned pattern as clearly shown in FIG. 1. The end loops or bights of the springs are closely spaced at roller 16 and widely spaced at roller 24. In a preferred form of the invention as illustrated to best advantage in FIGS. 1 and 4, the grooves of the rollers have progressively different and greater inclinations to the axes of the rollers from outer ends of the rollers inwardly to the center. Grooves 17' and 25' which entrain center spring 27' have straight parallel sides perpendicular to the axes of the rollers at the centers of the rollers. All the other grooves of both rollers have generally conical side walls W, W'. These walls have progressively greater inclinations from the center grooves out to the ends of the rollers. The walls W of the grooves in the one half of each roller are inclined oppositely to the walls W' in the other half of the roller. The walls of the grooves in each roller are aligned and with walls of corresponding grooves in the other roller. Due to varying inclinations of the walls of the grooves and different spacing of the grooves in the two rollers, the springs 27 assume the divergent disposition shown in FIG. 1. As roller 24 rotates the springs are drawn around the roller and in turn drive roller 16. The springs all have their straight upper courses 27'' disposed in the same horizontal plane.

Near the wider left end of the platform 12 are laterally spaced brackets 90 having vertical walls 91 and horizontal shelves 92 reinforced by braces 94. The brackets have flat bases 93 secured to platform 12 and reinforced by braces 95, extending between the bases 93 and vertical walls 91. The shelves 92 carry two vertical bolts 56. The bolts have bottom heads 58 on which rest horizontal brackets 60 provided with bearings 62 rotatably engaging ends of shafts 64, 65 on which are carried two cylindrical roller brushes 66, 68. The brushes rotate freely. The brackets 60 are biased downwardly by coil springs 70 engaged on the shanks of bolts 56. The brackets 60 can be lifted against the bias in the spring since the bolt shanks extend through holes 61 in the brackets. The bolts will remain stationary when the brackets 60 and brushes 66, 68 are lifted. The upper ends of the bolts are secured by nuts 72 and 73 to the shelves 92 and can be adjusted to vary the spacing between the brackets 60 and the undersides of the shelves.

A long trough 75 is carried on shelves 92 and is secured in place by brackets 76. This trough has two long parallel slots 78, 79 in its flat bottom 80. Two cloth sheets 82, 84 are tightly fitted in the slots 78, 79. These sheets are tightly woven or braided fabric which serve as wicks for oil 85 with which the trough will be filled. The upper ends of the wicks extend into the body of oil. The lower ends of the wicks terminate just above roller brushes 66, 68, respectively so that oil drips down on the brushes from the wicks as the brushes rotate during operation of the machine.

An inclined curved plate 88 is supported by bracket members 89 on inner edges of vertical bracket walls 91. This plate has an upper curved edge terminating near roller 42. The lower edge of the plate rests on the platform 12.

In operation of the machine, a thick sheet of dough D is deposited by hand or machine upon the right ends of the springs at roller 16. The dough will have a width no greater than the spacing between the outermost springs 27ᵃ, 27ᵇ at opposite ends of roller 16. As the springs move to roller 24, the sheet of dough thereon will be stretched in width due to the gradual increase in spacing between the springs from roller 16 to roller 24. As the sheet of dough is stretched in width it becomes thinner. The dough is effectively frictionally gripped by the coil springs since the coil turns engage in the underside of the soft dough without actually cutting the dough. As the thinned and stretched dough passes under the roller brushes 66, 68, the brushes are turned by engagement with the upper side of the dough. The brushes are lubricated by the dripping oil from wicks 82, 84 and in turn deposit a film of oil on the sheet. As the thinned and lubricated sheet of dough passes off of roller 42 it is guided downwardly by the curved plate 88 and forms into a roll R as clearly shown in FIG. 3. When the roll has a desired diameter, an operator can cut off the roll by passing a knife along plate 88. The free edge of the sheet passing off of roller 42 will curl up naturally to form the next roll. The cut off roll can be cut into slices or otherwise processed depending on the type of pastry, cake, or other article to be made. The free left end of platform 12 serves as a convenient work table for performing the further processing of the cut off roll while another roll R is being formed on the left end of the machine.

The machine will operate continuously if a continuous sheet of dough is deposited at the right end of the machine from a dough making machine or other supply of dough in sheet form. The machine saves a considerable amount of hand labor previously expended in manually rolling dough to sufficient thinness. The machine produces a sheet of dough in which the thinness is uniform throughout. It is entirely possible to obtain dough having a uniform thinness of about one-eighth of an inch. Such uniformity and thinness at high production speed has hitherto not been attainable by hand operations. The machine thus effects savings in costly labor and time and results in a more uniform and satisfactory product. It eliminates waste of material due to prior production of non-uniform overly thick pastry sheets. Baking time can be more precisely regulated and set since the thin pastry sheet is uniform in character, thus speeding up production and resulting in a product of higher quality at less cost.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A dough forming machine, comprising a stationary support, a pair of horizontally spaced cylindrical rollers rotatably carried by said support, said rollers being axially horizontal and parallel, one of said rollers being longer than the other roller, each of said rollers having axially spaced circumferential grooves therein, the grooves in the longer one roller being spaced further apart than the grooves in the shorter other roller, a plurality of endless belts entrained on the rollers and engaged in the grooves thereof so that upper straight courses of the belts define a horizontal coplanar divergent array between the shorter and longer rollers, each of said belts being a tensioned coil spring, and drive means operatively connected to either of the rollers for driving the same, whereby a sheet of dough deposited on the belts at the shorter roller is carried by the belts to the longer roller while the diverging belts stretch the dough laterally and thin the same throughout its width, the turns of the coil spring engaging the underside of the dough while it is carried between the rollers so that the dough is stretched and thinned uniformly, each of the grooves in both rollers having opposing frusto-conical walls inclined to the axes of the rollers, the inclinations of the walls increasing progressively from outer ends of the rollers toward the centers, the walls in the grooves of one half of each roller being inclined in the same direction, the walls in the grooves of the other half of each roller being inclined in an opposite direction, so that the belts remain engaged securely in the grooves at all times while the rollers turn.

References Cited by the Examiner

UNITED STATES PATENTS

| | | | |
|---|---|---|---|
| 1,434,181 | 10/22 | Wright et al. | 118—13 |
| 1,938,110 | 12/33 | Neutelings | 107—4.4 X |
| 2,173,632 | 9/39 | Peters | 107—9.2 |
| 2,349,423 | 5/44 | Haber | 118—13 |
| 2,357,679 | 9/44 | Moench | 118—13 |
| 2,674,209 | 4/54 | Anetsberger et al. | 107—9.2 |
| 2,892,422 | 6/59 | Casale | 107—4.2 |
| 3,043,244 | 7/62 | Engels | 107—9 |

FOREIGN PATENTS 564,276  6/57  Italy.

WALTER A. SCHEEL, *Primary Examiner.*